(12) United States Patent
Raza et al.

(10) Patent No.: US 12,279,223 B2
(45) Date of Patent: Apr. 15, 2025

(54) METHOD AND SYSTEM FOR WIRELESS LOCALISATION

(71) Applicant: Kabushiki Kaisha Toshiba, Tokyo (JP)

(72) Inventors: Usman Raza, Bristol (GB); Jagdeep Singh, Bristol (GB); Aleksandar Stanoev, Bristol (GB); Victor Marot, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 764 days.

(21) Appl. No.: 17/453,386

(22) Filed: Nov. 3, 2021

(65) Prior Publication Data
US 2023/0133978 A1    May 4, 2023

(51) Int. Cl.
*H04W 64/00* (2009.01)
(52) U.S. Cl.
CPC .................... *H04W 64/00* (2013.01)
(58) Field of Classification Search
CPC ........ H04W 64/00; G01S 1/0428; G01S 5/02; G01S 5/0205; G01S 1/68
See application file for complete search history.

(56) References Cited

U.S. PATENT DOCUMENTS

| 8,284,027 B2 * | 10/2012 | Taki | ............ H04B 1/7163 340/10.1 |
| 2019/0162817 A1 * | 5/2019 | Priyanto | ............... G01S 5/0236 |

OTHER PUBLICATIONS

Toshiba Starts Shipping World's Smallest Bluetooth® Low Energy Module, Toshiba (2021) https://www.toshiba.co.jp/about/press/2021_01/pr1401.htm, 4 pages.

* cited by examiner

*Primary Examiner* — Kabir A Timory
(74) *Attorney, Agent, or Firm* — Oblon, McClelland, Maier & Neustadt, L.L.P.

(57) ABSTRACT

A narrowband localization method including: concurrently transmitting, by a plurality of transmitters, a plurality of narrowband signals, wherein frequencies of respective narrowband signals are different from each other; receiving, by a receiver, a superimposed signal of the plurality of narrowband signals; and determining, by the receiver, a location of the receiver relative to the plurality of transmitters based on the superimposed signal received by the receiver.

20 Claims, 11 Drawing Sheets

METHOD AND SYSTEM FOR WIRELESS LOCALISATION

FIELD

Embodiments described herein relate to a method and system for wireless localisation and, more specifically, to a method and system for wireless localisation using a plurality of concurrently transmitting transmitters.

BACKGROUND

Spatial awareness is essential for mobile robots to cooperate to achieve shared tasks (such as lifting and carrying objects) in indoor spaces. The method of relying on the line-following robots limits the number of tasks that can be achieved. Wireless localization systems provide better use of space, more flexible navigation, and thus higher task throughput. Such mobility also requires localization of robots in the shortest possible time for high resolution tracking with minimum wireless channel occupancy.

For tracking and localization, the Bluetooth® Special Interest Group (Bluetooth® SIG) introduced two direction-finding techniques in Bluetooth v5.1 in January 2019. The two direction-finding techniques can be used to achieve sub-metre localization accuracy. Using the direction-finding techniques, the Bluetooth® device (as a receiver) can find a direction from which a received signal is transmitted. The principle behind the two techniques is to measure a phase difference of the received waveform of the received signal at multiple antennas and calculate the received signal's direction from the measured phase difference. In the Bluetooth® standard, only a single transmitter is assumed to be active when the phase difference is measured at any given time.

The two techniques mentioned above are known as the angle of arrival (AoA) technique and the angle of departure (AoD) technique. More precisely, in the AoA technique, the receiver is equipped with multiple antennas controlled using an RF switch. By measuring the phase difference observed at the multiple antennas at the receiver, the receiver can determine a transmitter's location. Conversely, in AoD, the transmitter is instead equipped with multiple antennas. The transmitter transmits the signal over multiple antennas via time divisional multiplexing. The receiver with a single antenna will estimate the transmitter's direction based on this time-multiplexed signal. FIG. 1 shows AoA and AoD localization systems. In the two techniques one side (receiver in AoA and transmitter in AoD) must have an antenna array.

Antenna arrays are not only expensive but also large in size, limiting their commercial adoption in commodity devices, so that the utility of these techniques are limited.

BRIEF DESCRIPTION OF THE DRAWINGS

Arrangements of embodiments will be understood and appreciated more fully from the following detailed description, made by way of example only and taken in conjunction with drawings in which.

DETAILED DESCRIPTION

Figure 1:
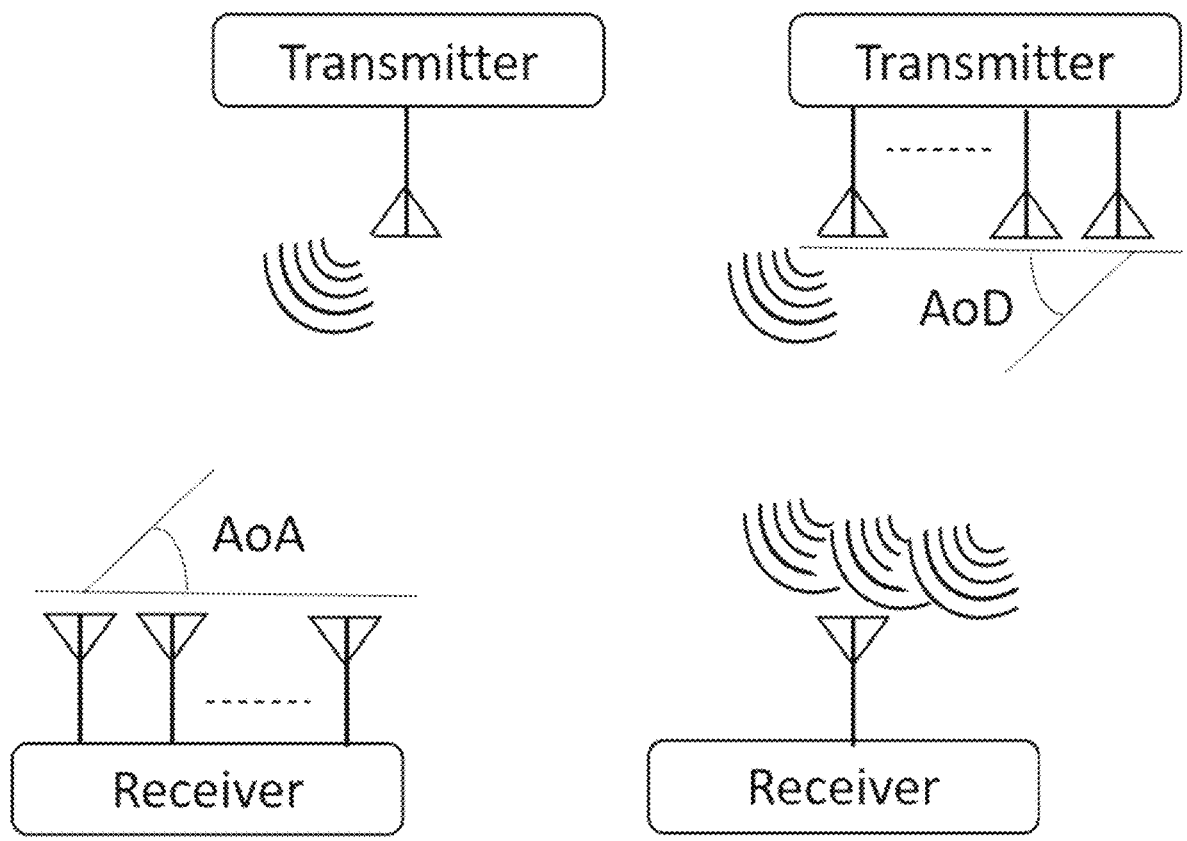
FIG. 1 shows known AoA and AoD localization systems.

According to an embodiment there is provided a narrowband localization method comprising: concurrently transmitting, by a plurality of transmitters, a plurality of narrowband signals, wherein frequencies of respective narrowband signals are different from each other; receiving, by a receiver, a superimposed signal of the plurality of narrowband signals; and determining, by the receiver, a location of the receiver relative to the plurality of transmitters based on the superimposed signal received by the receiver.

Further, the Constant Tone Extension (CTE) feature of Bluetooth® 5.1 enables a BLE transmitter to append a constant frequency sinusoidal waveform to the transmitted packet. The receiver, on its end, can sample the appended constant tone and collect in-phase and quadrature-phase (I/Q) components. In embodiments the CTE feature is exploited in single antenna BLE systems, in contrast to CTE's intended use with an antenna array on either the receiver in AoA or transmitter in AoD. By involving multiple transmitters to send CTE packets concurrently and for the receiver to apply novel signal processing techniques to identify the contribution of each transmitter on the signal received by the receiver the single antenna receiver can be located. Single antenna Bluetooth Low Energy (BLE) modules, due to their smaller footprint and low cost, can easily fit into small devices and are an integral part of mobile phones, wearables, and lighting fixtures. As such, narrowband localisation techniques are useful in a wide variety of devices and may be implemented in a space saving manner.

Embodiments disclose a localization system that uses concurrent narrowband transmissions from anchor nodes to minimize wireless channel occupancy. Embodiments use signal processing techniques in a receiver, for example in the form of mobile tags at mobile nodes in robots that can make the receiver spatially aware and intelligent to take location-dependent decisions. Embodiments achieve a very high-resolution tracking not possible with conventional Bluetooth® based localization systems.

In one embodiment standardized advances in Bluetooth® specifications, such as Constant Tone Extension (CTE) are used and exploited in novel ways different from their intended use. In another embodiment anchors are simple devices that receive a radiofrequency signal and backscatter a narrowband signal at a frequency characteristic to the backscatter tag. The signal received by the backscatter tag may have originated from the device that is attempting its own localisation.

It will be understood that "anchor", "anchor nodes" and "transmitters" can be used interchangeably and are generally understood to mean a component of the localization system that transmits a narrowband signal, such as a CTE signal or a narrowband backscatter signal.

It will be understood that "mobile tag", "mobile node", "mobile" and "receiver" can be used interchangeably and are generally understood to mean a component of the localization system that is to be located.

Advantageously, embodiments are useful in IoT localization and navigation services. they can help provide real-time location services (RTLS) to retail sectors (e.g. supermarkets, large warehouses), the medical sector and autonomous navigation applications (e.g. robot navigation). Moreover, embodiments may be useful in data acquisition services required for machine learning and sensor applications.

According to an embodiment there is provided a localization method, wherein determining the location, by the receiver, comprises: calculating, by the receiver, a Fourier transform of the superimposed signal; identifying, by the receiver, amplitudes of frequency components returned by the Fourier transform, wherein the frequency components correspond to frequencies of the plurality of narrowband signals; calculating, by the receiver, weights of the frequency components from the narrowband signals based on their respective peak amplitudes; and determining, by the receiver, a location of the receiver based on the weights and known coordinates of the plurality of transmitters.

According to an embodiment the localization method comprises determining, by the receiver, at least one dominant transmitter and calculating, by the receiver, weights of the frequency components based on their peak amplitudes.

According to an embodiment there is provided a localization method, wherein determining the location, by the receiver, comprises: identifying, by the receiver, at least one beating component within the superimposed signal, wherein a beating component is a superimposed pair of narrowband signals that form the superimposed signal; determining, by the receiver, a peak amplitude of the at least one beating component; determining, by the receiver, peak amplitudes of the plurality of narrowband signals transmitted by the plurality of transmitters; calculating, by the receiver, weights for each transmitter based on the peak amplitude of the at least one beating component and the peak amplitudes plurality of narrowband signals transmitted by the plurality of transmitters; and determining, by the receiver, a location of the receiver based on the weights and known coordinates of the plurality of transmitters. According to an embodiment there is provided a localization method, wherein the weights for each transmitter are calculated using the equation:

$$W(i)=\Sigma_{j=i, i,j=1}^{n} P|\omega_i - \omega_j| + P(\omega_i)$$

wherein: W(i) is the weight for each transmitter from the plurality of transmitters;
i and j are indexes for the plurality of transmitters; ω is the frequency of the narrowband signal in radians; $\omega_i - \omega_j$ is the frequency of the at least one beating component; and P is a function of the peak amplitude at the frequency of the narrowband signal or the at least one beating component.

According to an embodiment there is provided a localization method, wherein the location of the receiver is determined using the equation:

$$x_r = \Sigma_{i=1}^{n}(W(i)*x_t(i))/\Sigma_{i=1}^{n} W(i); \text{ and}$$

$$y_r = \Sigma_{i=1}^{n}(W(i)*y_t(i))/\Sigma_{i=1}^{n} W(i)$$

wherein:
($x_r, y_r$) are the calculated coordinates of the receiver; W(i) is the weight for each transmitter from the plurality of transmitters; ($x_t(i), y_t(i)$) are the known 2D coordinates of the plurality of transmitters; n is a total number of transmitters from the plurality of transmitters; and i is an index for the plurality of transmitters.

According to an embodiment there is provided a localization method, wherein identifying the at least one beating component comprises: calculating, by the receiver, a squared-envelop signal of the superimposed signal; calculating, by the receiver, a Fourier transform of the squared-envelop signal; and determining, by the receiver, a number of peaks of the Fourier transform, wherein the number of peaks corresponds to a number of beating component.

According to an embodiment there is provided a localization method, wherein calculating, by the receiver, a squared-envelop signal of the superimposed signal comprises calculating a squared value of a Hilbert transform of the superimposed signal.

According to an embodiment there is provided a localization method, wherein the method further comprises determining, by the receiver, at least one dominant beating component amongst the at least one beating component.

According to an embodiment there is provided a localization method, wherein determining, by the receiver, the at least one dominant beating component amongst the at least one beating component comprises: determining, by the receiver, at least one beating component that exceeds a predetermined amplitude threshold; and identifying, by the receiver, the at least one beating component that exceeds the predetermined amplitude threshold as the at least one dominant beating component.

According to an embodiment there is provided a narrowband localization method configured to be carried out by a receiver comprising: receiving, by the receiver, a superimposed signal of a plurality of narrowband signals, wherein the plurality of narrowband signals were concurrently transmitted by a plurality of transmitters, wherein frequencies of respective narrowband signals are different from each other; and determining, by the receiver, a location of the receiver relative to the plurality of transmitters based on the superimposed signal received by the receiver.

According to an embodiment there is provided a computer system comprising at least one non-volatile memory and at least one processor, the at least one non-volatile memory storing instructions for execution by the at least one processor, the instruction configured to cause the at least one processor to, when executed: cause a plurality of transmitters to concurrently transmit a plurality of narrowband signals, wherein frequencies of respective narrowband signals are different from each other; cause a receiver to receive a superimposed signal of the plurality of narrowband signals; and cause a the receiver to determine a location of the receiver relative to the plurality of transmitters based on the superimposed signal received by the receiver.

According to an embodiment there is provided a computer system, wherein the determination of the location, by the receiver, comprises: the receiver to calculate a Fourier transform of the superimposed signal; the receiver to identify amplitudes of frequency components returned by the Fourier transform, wherein the frequency components correspond to frequencies of the plurality of narrowband signals; the receiver to calculate weights of the frequency components from the narrowband signals based on their respective peak amplitudes; and the receiver to determine a location of the receiver based on the weights and known coordinates of the plurality of transmitters.

According to an embodiment there is provided a computer system, wherein the determination of the location, by the receiver, comprises: the receiver to identify at least one beating component within the superimposed signal, wherein a beating component is a superimposed pair of narrowband signals that form the superimposed signal; the receiver to determine a peak amplitude of the at least one beating component; the receiver to determine peak amplitudes of the plurality of narrowband signals transmitted by the plurality of transmitters; the receiver to calculate weights of the at least one beating component based on the peak amplitude of the at least one beating component and the peak amplitudes plurality of narrowband signals transmitted by the plurality of transmitters; and the receiver to determine a location of the receiver based on the weights and known coordinates of the plurality of transmitters.

According to an embodiment there is provided a computer system, wherein the identification of the at least one beating component comprises: the receiver to calculate a squared-envelop signal of the superimposed signal; the receiver to calculate a Fourier transform of the squared-envelop signal; and the receiver to determine a number of peaks of the Fourier transform, wherein the number of peaks corresponds to a number of beating component.

According to an embodiment there is provided a computer system, wherein the determination of the location, by the receiver, further comprises the receiver to determine at least one dominant beating component amongst the at least one beating component.

According to an embodiment there is provided a computer system, wherein the determination of the at least one dominant beating component, by the receiver, further comprises: the receiver to determine at least one beating component that exceeds a predetermined amplitude threshold; and the receiver to identify the at least one beating component that exceeds the predetermined amplitude threshold as the at least one dominant beating component.

According to an embodiment there is provided a computer readable storage medium comprising instructions for execution by at least one processor that when executed by the at least one processor is configured to cause the at least one processor to, when executed: cause a plurality of transmitters to concurrently transmit a plurality of narrowband signals, wherein frequencies of respective narrowband signals are different from each other; cause a receiver to receive a superimposed signal of the plurality of narrowband signals; and cause a the receiver to determine a location of the receiver relative to the plurality of transmitters based on the superimposed signal received by the receiver.

According to an embodiment there is provided a narrowband localization method configured to be carried out by a receiver, wherein determining the location, by the receiver, comprises: calculating, by the receiver, a Fourier transform of the superimposed signal; identifying, by the receiver, amplitudes of frequency components returned by the Fourier transform, wherein the frequency components correspond to frequencies of the plurality of narrowband signals; calculating, by the receiver, weights of the frequency components from the narrowband signals based on their respective peak amplitudes; and determining, by the receiver, a location of the receiver based on the weights and known coordinates of the plurality of transmitters.

According to an embodiment there is provided a narrowband localization method configured to be carried out by a receiver, wherein determining the location, by the receiver, comprises: identifying, by the receiver, at least one beating component within the superimposed signal, wherein a beating component is a superimposed pair of narrowband signals that form the superimposed signal; determining, by the receiver, a peak amplitude of the at least one beating component; determining, by the receiver, peak amplitudes of the plurality of narrowband signals transmitted by the plurality of transmitters; calculating, by the receiver, weights for each transmitter based on the peak amplitude of the at least one beating component and the peak amplitudes plurality of narrowband signals transmitted by the plurality of transmitters; and determining, by the receiver, a location of the receiver based on the weights and known coordinates of the plurality of transmitters.

According to an embodiment there is provided a narrowband localization method configured to be carried out by a receiver, wherein the weights for each transmitter are calculated using the equation:

$$W(i)=\Sum_{j\neq i, i, j=1}^{n} P|\omega_i-\omega_j|+P(\omega_i)$$

wherein: $W(i)$ is the weight for each transmitter from the plurality of transmitters; i and j are indexes for the plurality of transmitters; $\omega$ is the frequency of the narrowband signal in radians; $\omega_i-\omega_j$ is the frequency of the at least one beating component; and P is a function to determine the peak amplitude at the frequency of the narrowband signal or the at least one beating component According to an embodiment there is provided a narrowband localization method configured to be carried out by a receiver, wherein the location of the receiver is determined using the equation:

$$x_r = \Sum_{i=1}^{n}(W(i)*x_t(i))/\Sum_{i=1}^{n} W(i); \text{ and}$$

$$y_r = \Sum_{i=1}^{n}(W(i)*y_t(i))/\Sum_{i=1}^{n} W(i)$$

wherein: $(x_r, y_r)$ are the calculated coordinates of the receiver; $W(i)$ is the weight for each transmitter from the plurality of transmitters; $(x_t(i), y_t(i))$ are the known 2D coordinates of the plurality of transmitters; n is a total number of transmitters from the plurality of transmitters; and i is an index for the plurality of transmitters According to an embodiment there is provided a narrowband localization method configured to be carried out by a receiver, wherein identifying the at least one beating component comprises: calculating, by the receiver, a squared-envelop signal of the superimposed signal; calculating, by the receiver, a Fourier transform of the squared-envelop signal; and determining, by the receiver, a number of peaks of the Fourier transform, wherein the number of peaks corresponds to a number of beating component.

According to an embodiment there is provided a narrowband localization method configured to be carried out by a receiver, wherein calculating, by receiver, a squared-envelop signal of the superimposed signal comprises calculating a squared value of a Hilbert transform of the superimposed signal.

According to an embodiment there is provided a narrowband localization method configured to be carried out by a receiver, wherein the method further comprises determining, by the receiver, at least one dominant beating component amongst the at least one beating component.

According to an embodiment there is provided a narrowband localization method configured to be carried out by a receiver, wherein determining, by the receiver, the at least one dominant beating component amongst the at least one beating component comprises: determining, by the receiver, at least one beating component that exceeds a predetermined amplitude threshold; and identifying, by the receiver, the at least one beating component that exceeds the predetermined amplitude threshold as the at least one dominant beating component.

According to an embodiment there is provided a receiver comprising at least one non-volatile memory and at least one processor, the at least one non-volatile memory storing instructions for execution by the at least one processor, the instruction configured to cause the at least one processor to, when executed: causes, the receiver, to receiver a superimposed signal of a plurality of narrowband signals, wherein the plurality of narrowband signals were concurrently transmitted by a plurality of transmitters, wherein frequencies of respective narrowband signals are different from each other; and causes, the receiver, to determine a location of the receiver relative to the plurality of transmitters based on the superimposed signal received by the receiver.

According to an embodiment there is provided a receiver, wherein the determination of the location, by the receiver, comprises: the receiver to calculate a Fourier transform of the superimposed signal; the receiver to identify amplitudes of frequency components returned by the Fourier transform, wherein the frequency components correspond to frequencies of the plurality of narrowband signals; the receiver to calculate weights of the frequency components from the narrowband signals based on their respective peak amplitudes; and the receiver to determine a location of the receiver based on the weights and known coordinates of the plurality of transmitters.

According to an embodiment there is provided a receiver, wherein the determination of the location, by the receiver, comprises: the receiver to identify at least one beating component within the superimposed signal, wherein a beating component is a superimposed pair of narrowband signals that form the superimposed signal; by the receiver to determine a peak amplitude of the at least one beating component; the receiver to determine peak amplitudes of the plurality of narrowband signals transmitted by the plurality of transmitters; the receiver to calculate weights of the at least one beating component based on the peak amplitude of the at least one beating component and the peak amplitudes plurality of narrowband signals transmitted by the plurality of transmitters; and the receiver to determine a location of the receiver based on the weights and known coordinates of the plurality of transmitters.

According to an embodiment there is provided a receiver, wherein the identification of the at least one beating component comprises: the receiver to calculate a squared-envelop signal of the superimposed signal; the receiver to calculate a Fourier transform of the squared-envelop signal; and the receiver to determine a number of peaks of the Fourier transform, wherein the number of peaks corresponds to a number of beating component.

According to an embodiment there is provided a receiver, wherein the determination of the location, by the receiver, further comprises the receiver to determine at least one dominant beating component amongst the at least one beating component.

According to an embodiment there is provided a receiver, wherein the determination of the at least one dominant beating component, by the receiver, further comprises: the receiver to determine at least one beating component that exceeds a predetermined amplitude threshold; and the receiver to identify the at least one beating component that exceeds the predetermined amplitude threshold as the at least one dominant beating component.

According to an embodiment there is provided a computer readable storage medium comprising instructions for execution by at least one processor of a receiver that when executed by the at least one processor is configured to cause the at least one processor to, when executed: cause, the receiver, to receive a superimposed signal of a plurality of narrowband signals, wherein the plurality of narrowband signals were concurrently transmitted by a plurality of transmitters, wherein frequencies of respective narrowband signals are different from each other; and cause, the receiver, to determine a location of the receiver relative to the plurality of transmitters based on the superimposed signal received by the receiver.

According to an embodiment there is provided a computer readable storage medium comprising instructions for execution by at least one processor of a receiver, wherein execution by at least one processor of a receiver that when executed by the at least one processor is configured to cause the at least one processor to, when executed: cause the receiver to identify at least one beating component within the superimposed signal, wherein a beating component is a superimposed pair of narrowband signals that form the superimposed signal; cause the receiver to determine a peak amplitude of the at least one beating component; cause the receiver to determine peak amplitudes of the plurality of narrowband signals transmitted by the plurality of transmitters; cause the receiver to calculate weights for each transmitter based on the peak amplitude of the at least one beating component and the peak amplitudes plurality of narrowband signals transmitted by the plurality of transmitters; and cause the receiver to determine a location of the receiver based on the weights and known coordinates of the plurality of transmitters.

According to an embodiment there is provided a narrowband localization method configured to be carried out by a transmitter comprising: concurrently transmitting, by the plurality of transmitters, a plurality of narrowband signals, wherein frequencies of respective narrowband signals are different from each other, wherein: a superimposed signal of the plurality of narrowband signals is received by a receiver; and a location of the receiver relative to the plurality of transmitters based on the superimposed signal received by the receiver is determined by the receiver.

In an embodiment each transmitter transmits a signal at a single frequency or at a narrowband frequency only. The transmitters may be configured to transmit at predetermined/pre-set frequencies. Alternatively, the frequencies at which the transmitters transmit may be hardware specific and may be different between different ones of the transmitter because of imperfections in the crystal oscillators.

According to an embodiment there is provided a plurality of transmitters each comprising at least one non-volatile memory and at least one processor, the at least one non-volatile memory storing instructions for execution by the at least one processors the instruction configured to cause the at least one processor to, when executed: cause, the plurality of transmitters, to concurrently transmit a plurality of narrowband signals, wherein frequencies of respective narrowband signals are different from each other, wherein: a superimposed signal of the plurality of narrowband signals is received by a receiver; and a location of the receiver relative to the plurality of transmitters based on the superimposed signal received by the receiver is determined by the receiver.

According to an embodiment there is provided a computer readable storage medium comprising instructions for execution by the at least one processor of a transmitter from a plurality of transmitters that when executed by the at least one processor will cause the at least one processor is configured to cause the at least one processor to, when executed: causing, the plurality of transmitters, to concurrently transmit a plurality of narrowband signals, wherein frequencies of respective narrowband signals are different from each other, wherein: a superimposed signal of the plurality of narrowband signals is received by a receiver; and a location of the receiver relative to the plurality of transmitters based on the superimposed signal received by the receiver is determined by the receiver.

Figure 2:
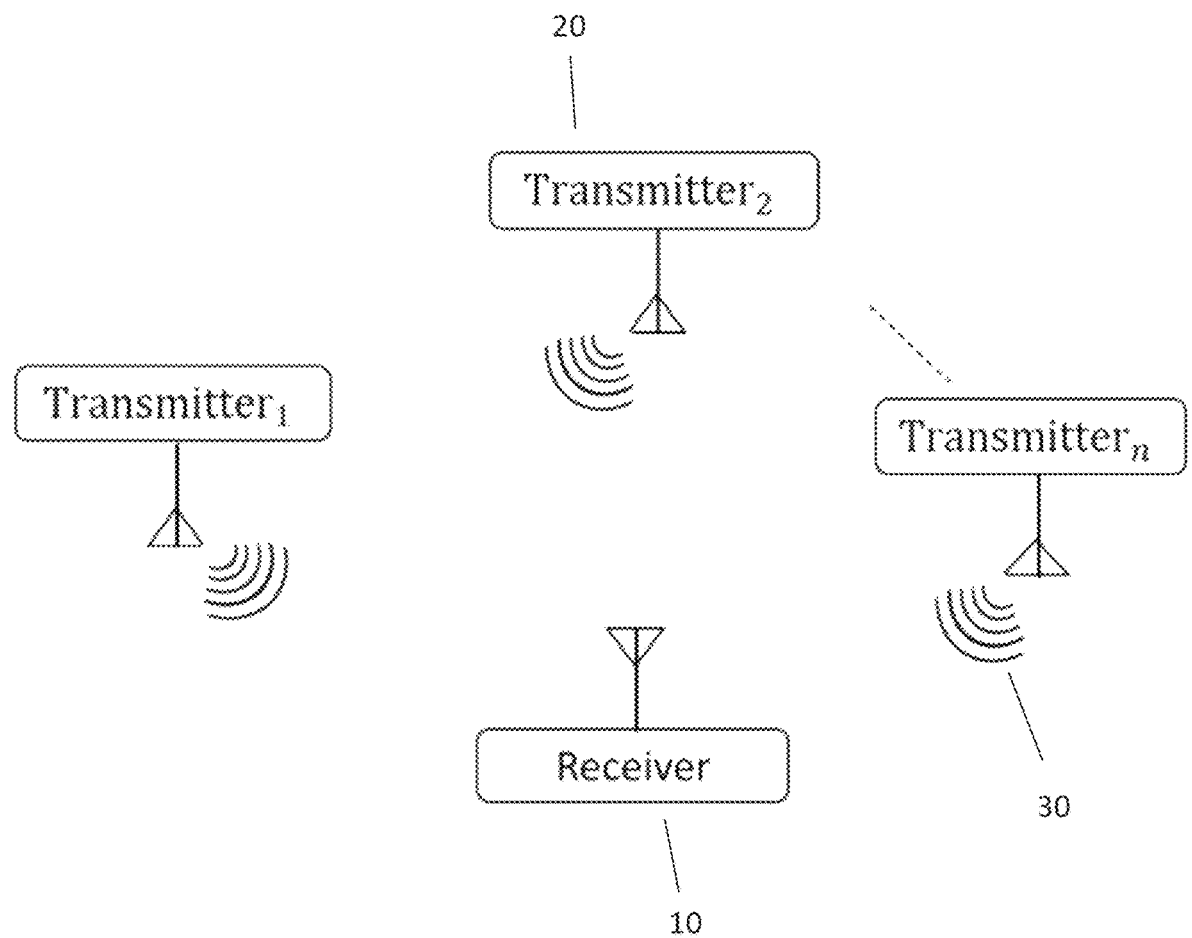
FIG. 2 shows a localization system according to an embodiment.

FIG. 2 shows a localization system according to an embodiment. Embodiments eliminate the need for antennas arrays for transmission or reception of direction signals. Instead of antenna arrays, spatially distributed synchronous single transmitters 20 at anchor nodes each individually transmit a transmission signal 30 at different frequencies from each other are used. These transmitters 20 are at known locations and provide reference points for the location determination. In an embodiment each of the transmission signals 30 include a constant tone extension (CTE) with different frequencies from each other according to the relevant Bluetooth® standard, e.g. Bluetooth® 5.1. In an embodiment, the frequencies of each individual transmission signal may intentionally have different frequencies. In another embodiment, the frequencies may have different frequencies from each other due to the presence of inherently imperfect crystal oscillators.

A receiving device 10, a single transmitter from the plurality of transmitters 20 or a further device initially transmits a localization request signal to the other transmitters amongst the plurality of transmitters 20.

In the example where the receiving device transmits the localization request signal, the receiving device 10, that has a single receiving antenna, will in response receive the transmission signal 30 including the individual CTE signals from the multiple transmitters 20. Thereafter, the receiver 10 determines its location based on beating signals. A beating signal is a signal formed by the superposition of CTE signals 30 from the plurality of transmitters 20. A beating signal is a signal formed by the superposition of at least two CTE signals 30 from a corresponding from the plurality of transmitters 20. The at least two CTE signals 30 have frequencies different (off-setted) from each other. A beating signal, as a result of constructive and destructive interference between the CTE signals 30, has a beating amplitude and frequency. The beating signal has beating components. A beating component is a superimposed pair of narrowband signals, in this case, CTE signals 30 that form the beating signal received by the receiver 10. Each beating component comprises a beating frequency, wherein the beating frequency is defined as the difference in frequency between the pair of narrowband signals 30 that form the beating component. The receiver 10 determines its own location based on a power amplitudes of the beating components received at various beating frequencies. This is explained in further detail below.

The proposed system and method of embodiments removes the burden of using a specially designed antenna arrays such as the one shown in FIG. 1 for the direction of angle calculations. Moreover, antenna spacing is a primary concern in AoA and AoD techniques. In antenna arrays, undesired coupling can occur between antennas, which severely reduces the antenna efficiency and localization performance. This is because the AoA and AoD angle values depend on the spacing between the different antennas in an antenna array. These concerns are eliminated in embodiments.

Figure 3:
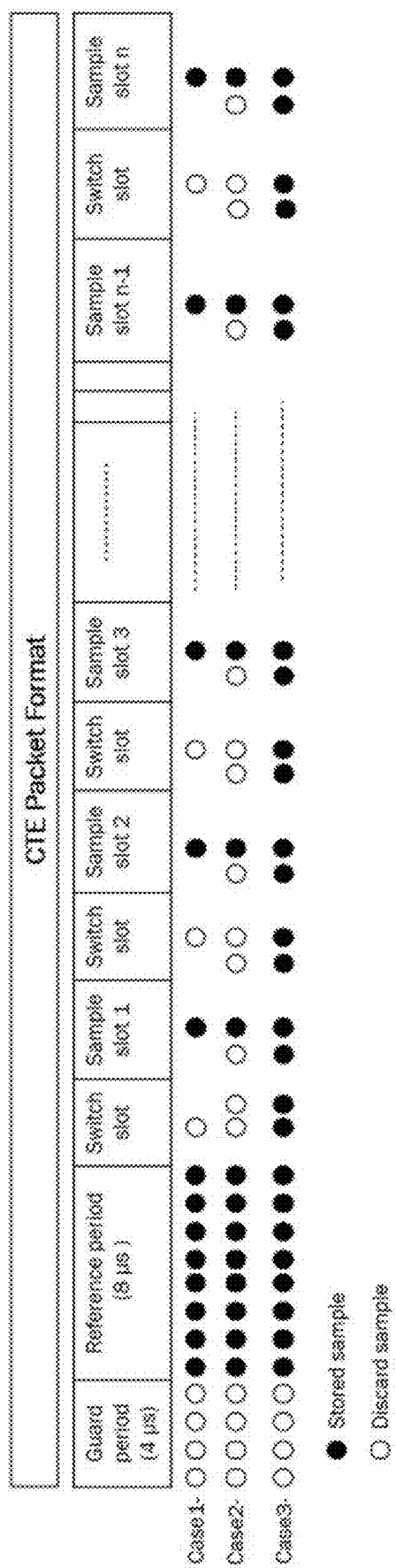
FIG. 3 shows example CTE packet formats according to the Bluetooth® 5.1 specification.

FIG. 3 shows an example CTE packet format 300 according to the Bluetooth® 5.1 specification. Bluetooth® 5.1 features a new link layer protocol data units (PDUs). The new PDUs append packet with an additional field known as Constant Tone Extension (CTE). CTE is a constant frequency signal consisting of unwhitened and constant 1's. The purpose of CTE is to provide a constant wavelength signal that can be sampled by a receiver. The length of the CTE field can vary between 16 µs and 160 µs. The CTE field can be further divided into different sub-fields: first a guard band of 4 µs, second reference period of 8 µs and the rest of the CTE field is divided into slots for antenna switching and sampling. The switching and sampling slots can either be 1 µs long or 2 µs. The exact length of the switching and sampling is configured by the host device. In an example, the CTE field is long enough to collect around 74 samples if 1 µs sample periods are used.

In the AoA of Bluetooth® 5.1, the CTE field is sampled by the receiver across multiple antennas in an antenna array. In contrast, in embodiments samples are obtained using a single antenna at the receiver 10.

In the Bluetooth® 5.1 standard, the packet format 300 for CTE is defined. However, the nature of using the switching and sampling slots for collecting samples and calculating the phase offset of the samples is neither mandatory nor defined. Instead, manufactures can develop their own methods of manipulating the CTE packet 300. Different forms of CTE packet format 300 manipulation is described below in relation to FIG. 3.

FIG. 3 shows a first case (Case1), where a receiver implementing an AoA technique uses 1 µs switching and sampling slots, where consecutive 1 µs time slots used consecutively by antennae in the receiver array are interleaved with 1 µs switching time slots in which the receiver switches between the receiver antennae and is unable to sample any received signal. This gives a total of n=74 stored/acquired samples over the length of the CTE packet.

The second case (Case2) shown in FIG. 3 relates to an AoA technique uses 2 µs switching and sampling slots. Because only one time slot in the sampling slot is useable/provides unique information the total number of stored/acquired samples is halved (when compared with Case 1 discussed above) to n=37.

In embodiments detecting CTE based narrowband signals, up to two 1 µs sampling periods in each of the sampling as well as switching slots can be used for sample acquisition (see Case 3 in FIG. 3). This gives a maximum total of n=148 stored samples when a 1 µs sample period is used with 74 2 µs switching and sampling slots.

Case 1 and Case 2 discards many samples taken during the switching and sampling periods for the implementation of the BLE 5.1 AoA technique, in particular when a 2 µs sampling period is used. In contrast, embodiments effectively use the CTE packet format 300 by maximising, or at least increasing, the total number of stored samples. Consequently, the embodiments provide high-resolution sampling, as a result of acquiring more, samples over the length of CTE packets. This provides a more accurate location determination by and of the receiver 10.

As the CTE packet 300 consists of 1's only with no information attached to it (excluding the guard period), there is no requirement to demodulate the CTE signal 30 at the receiver. However, the receiver 10 can extract some information about the channel. The proposed method involves the use of this information to locate the receiver 10. Specifically, in the proposed method a change in amplitude at the signal frequency and beating frequency amplitudes for the transmitter are used to locate receiver. The main structural differences between the proposed method and the AoA and AoD techniques are shown in Tables 1 & 2.

Table 1 shows the role of transmitters and receivers in antenna switching and sampling in AoA, AoD and concurrent CTE (present invention) methods.

|  | AOA | | AoD | | Concurrent CTE | |
| --- | --- | --- | --- | --- | --- | --- |
|  | Antenna switching | IQ sampling | Antenna Switching | IQ sampling | Antenna Switching | IQ sampling |
| Transmitter | — | — | ✓ | — | — | — |
| Receiver | ✓ | ✓ | — | ✓ | — | ✓ |

Table 2 shows the role of transmitters and receivers in antenna switching and sampling in AoA, AoD and concurrent CTE (present invention) methods and their usage.

| Direction Finding Method | Transmitter | Receiver | Usage |
| --- | --- | --- | --- |
| AoA | Single antenna, transmits CTE packet | Multiple antennas, captures an I/Q data of the CTE by switching between antennas | Receiving devices track other objects |
| AoD | Multiple antennas, transmit CTE packet while switching through multiple antennas | Single antenna, can capture I/Q data of the CTE | Receiving devices track their own positions |
| Concurrent CTE | Spatially distributed synchronous transmitters transmit different constant tones | Single antenna | Receiving device track their position |

Figure 4:
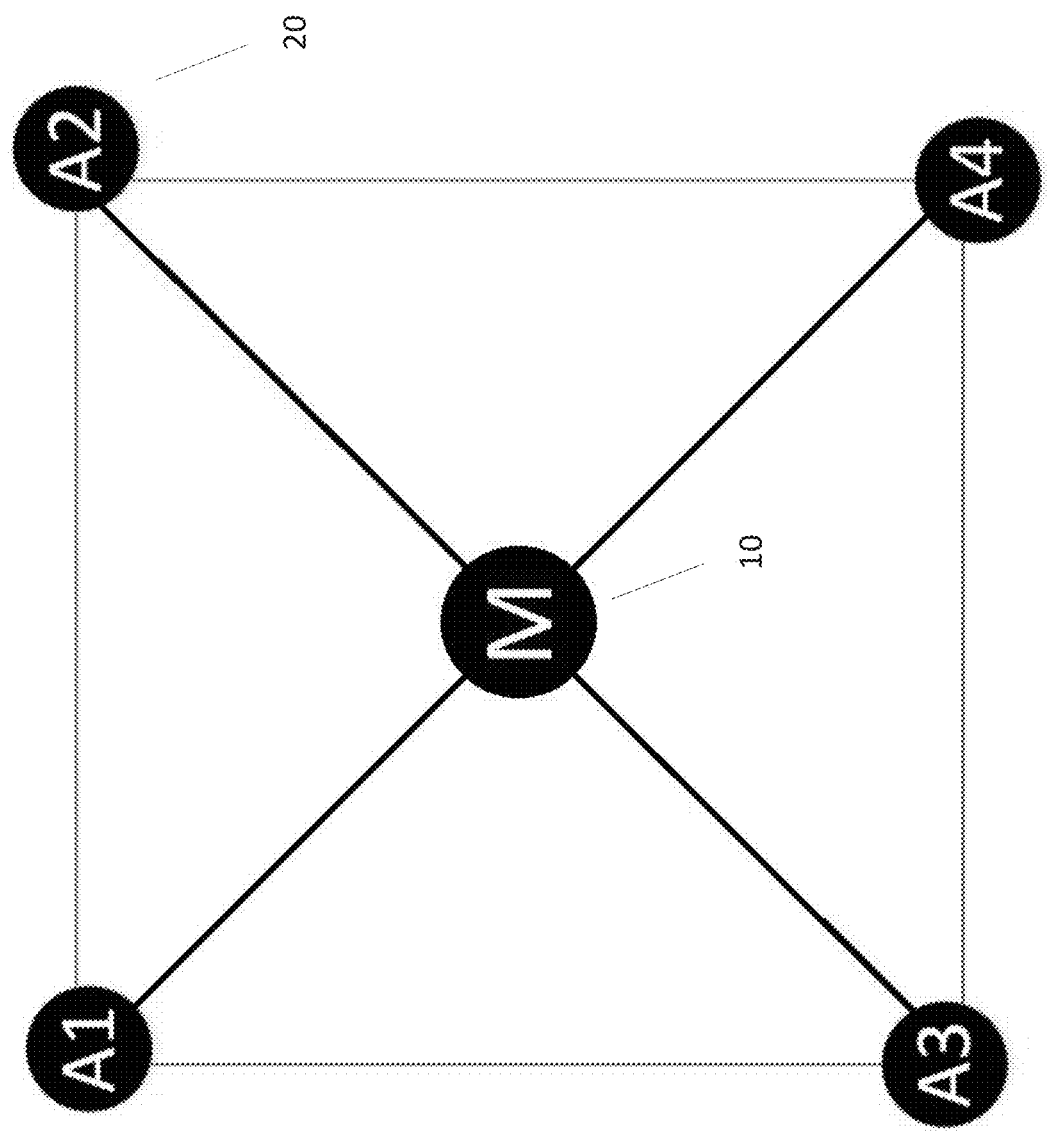
FIG. 4 shows an example arrangement of anchors (transmitters) and a mobile tag (receiver)

FIG. 4 shows an example arrangement of anchors 20 (A1, A2, A3 and A4) and a mobile tag 10 (M). The anchors 20 are equivalent to the plurality of transmitter 20 in FIG. 2. The mobile tag 10 is equivalent to the receiver 10 in FIG. 2.

Unlike the Bluetooth® 5.1 AoA and AoD direction-finding solutions, embodiments use beating frequencies to locate a receiver 10. When two signals of different frequencies are superimposed, the resulting signal will produce a beating frequency. The beating frequency is the difference in frequency between the two signals.

N-Anchor devices transmit sufficiently long CTE packets 300 with frequencies ($\omega_1$, $\omega_2$, $\omega_3$, ..., $\omega_n$) concurrently, as shown in FIG. 3. The N-Anchor devices, which are transmitters, are spatially distributed at known locations, as shown in FIG. 2. The transmitted CTE signals 30 from each of the n spatially distributed synchronous transmitters 20 (anchor nodes), can respectively be represented as $a_1 \cos(\omega_1 t)$, $a_2 \cos(\omega_2 t)$ ... $a_n \cos(\omega_n t)$, wherein $\omega$ is the angular frequency of the CTE signals 30 in radians, t is time in seconds and a is the amplitude of the N transmitted CTE signals 30. The transmitted CTE signals 30 can also be represented in the frequency domain (hertz) using the equation 1 below, wherein $\omega = 2\pi f$.

$$\text{Constant Tone Signals}_i = a_i \cos(2\pi f_i t); \quad (1)$$

A mobile tag M (Mobile node), being equivalent to the receiver 10 in FIG. 2, receives a superimposed signal at a location which is to be determined. The superimposed signal is the sum of the CTE signals 30 from the N-Anchor devices at the location in which the mobile tag M is situated at the time of sampling. The amplitude of the individual CTE signals 30 after attenuation and as received at the mobile tag M is assumed to be $A_1, A_2 \ldots A_n$. Therefore, in this case, the superimposed signal received by the mobile tag M can be described using equation 2 below. For simplicity, the equation does not take into account any impairments caused by the channel.

$$\text{Superimposed Signal} = \sum_{i=1}^{n} A_i \cos(2\pi f_i t) \quad (2)$$

Figure 5:
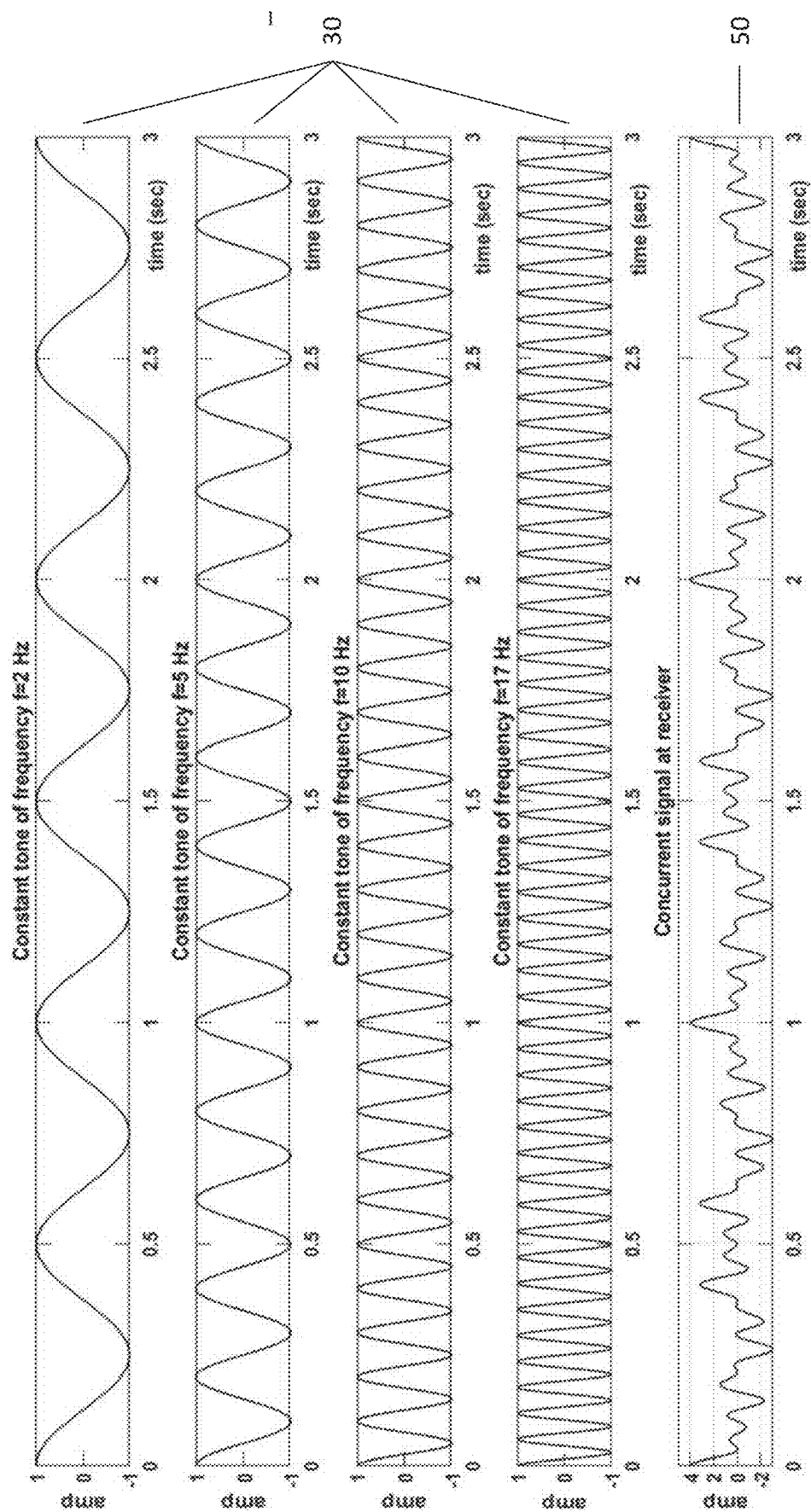
FIG. 5 shows transmitted narrowband signals at different frequencies by the anchor nodes and a resulting signal comprising a superposition of components of the transmitted signal and containing several beat frequencies as received at the mobile node.

FIG. 5 shows the transmitted CTE signals 30 at different frequencies by the anchor nodes (A1, A2, A3 and A4) and the resulting superimposed signal 50 containing several beating components at beating frequencies at the mobile node M according to an embodiment.

To determine the location of the mobile tag M, at least one dominant transmitter may be identified. To determine the at least one dominant transmitter, embodiments determine the power amplitudes of all beating components at their beating frequencies. In other words, contributions of all concurrent transmitter pairs are identified on the superimposed signal 50 are identified to determine a dominant concurrent transmitter pair.

Where there are only two anchors, only one dominant transmitter is required to be identified and the dominant concurrent transmitter pair in this case will be the two anchors.

To extract the contribution of all concurrent transmitter pairs on the beating frequencies, the receiver 10, or mobile tag M in this instance, extracts a squared-envelop of the received superimposed signal 50. In an embodiment, the squared-envelop of the received superimposed signal 50 can be extracted by taking the squared value of the Hilbert transform of the superimposed signal 50, as shown here:

$$\left| \text{Hilbert}\left( \sum_{i=1}^{n} A_i \cos(2\pi f_i t) \right) \right|^2$$

Figure 6:
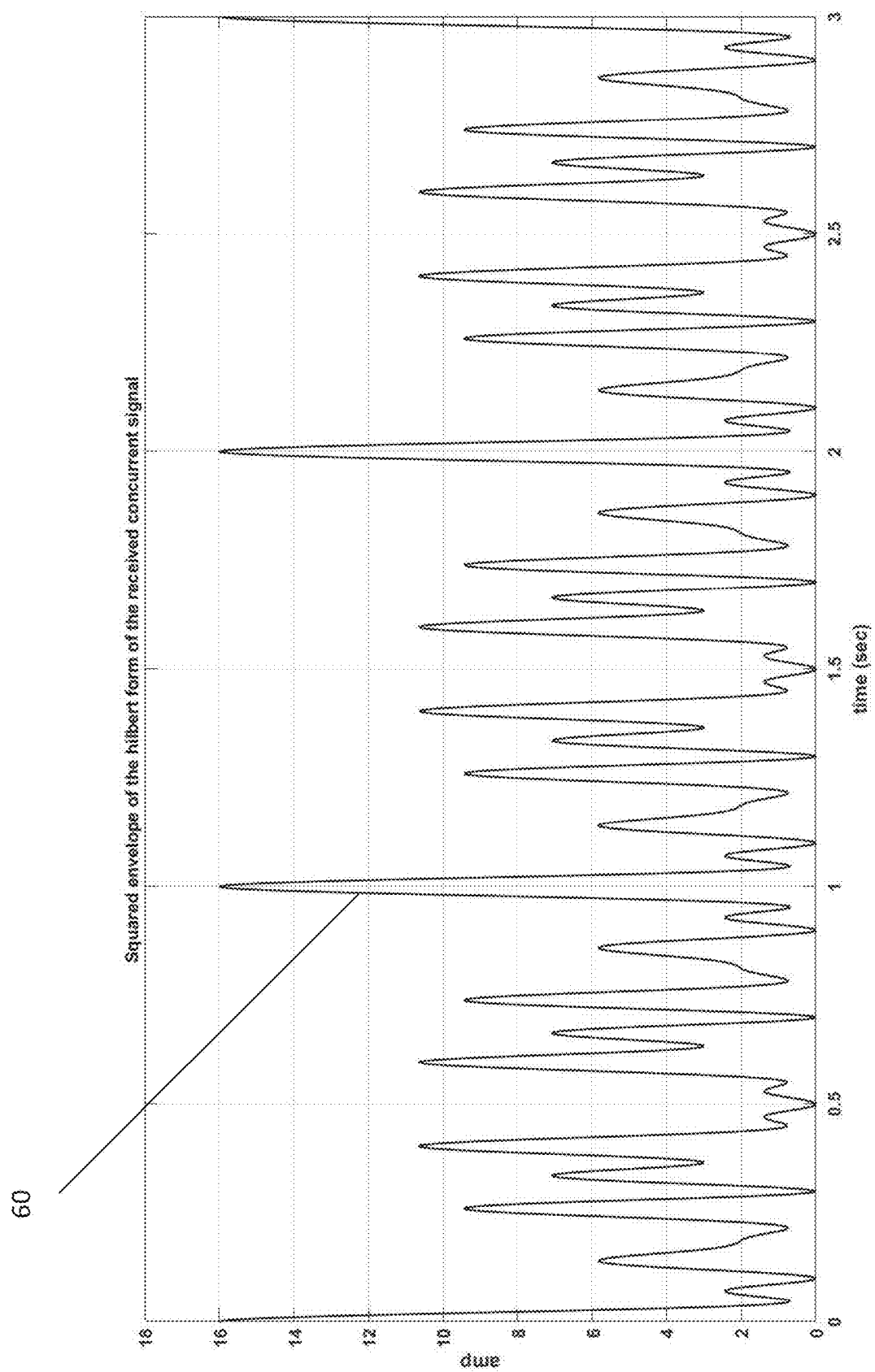
FIG. 6 shows the squared-envelop of the Hilbert form of the received superimposed signal.
Figure 7:
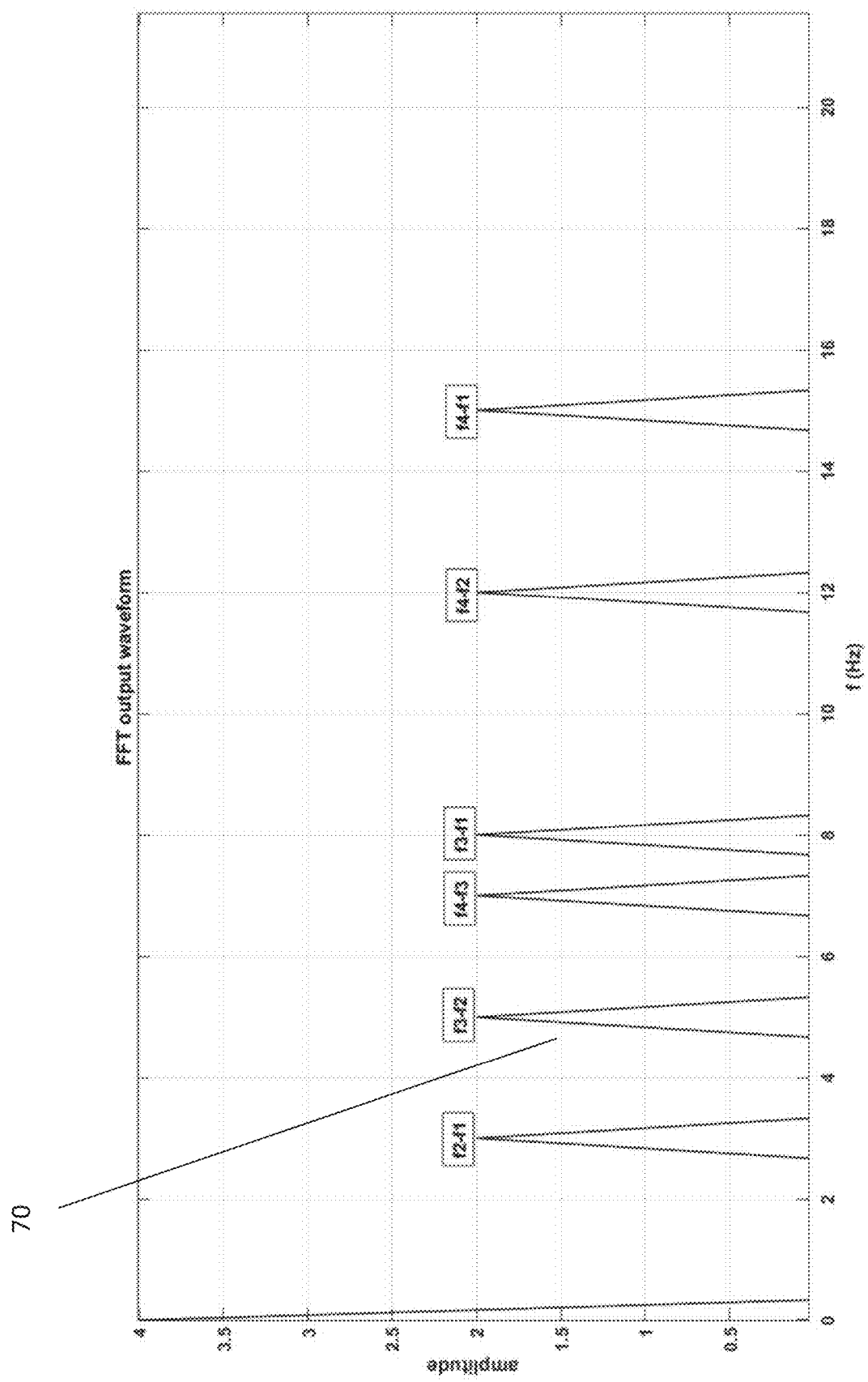
FIG. 7 shows a single-sided spectrum of the frequency power spectrum representing the frequency on the x-axis and received power amplitudes at those frequencies on Y-axis.

FIG. 6 shows the squared-envelop 60 of the Hilbert form of the received superimposed signal 50. Thereafter, a Fourier transform, such as a Fast Fourier Transform (FFT) can be applied to the output of the squared-envelop 60 in FIG. 6 to identify the amplitude of beating frequencies. In an embodiment, the amplitude may be an amplitude of power of the beating frequencies. The Fourier transform of the squared-envelop signal 60 can be expressed as shown in the expression below. FIG. 7 shows a frequency power spectrum 70 of the squared-envelop signal 60 by taking the FFT of the outputted squared-envelop signal 60.

$$fft\left\{ \left| \text{Hilbert}\left( \sum_{i=1}^{n} A_i \cos(2\pi f_i t) \right) \right|^2 \right\}$$

Beating frequencies and their corresponding power amplitudes can be extracted using the steps outlined above.

In another embodiment, the input frequency signals (CTE signals 30 of each anchor) can be extracted directly from the received superimposed signal 50 by taking the FFT of the superimposed signal 50 without finding the squared-envelop of the superimposed signal 50.

FIG. 7 shows a single-sided spectrum of the frequency power spectrum 70 representing the frequency on the x-axis and received power amplitudes at those frequencies on Y-axis. A total of 6 ($^4C_2$) peaks (all possible pairs of concurrent transmitters 20) can be identified, corresponding to the absolute numerical difference between constant tone frequencies.

In the above example, it is evident from FIG. 7 that the power amplitudes of all four constant tones at the receiver 10 were the same. This is because the FIG. 4 shows that the receiver (mobile tag M) is equidistant from all four transmitters (anchors). Therefore, the peaks corresponding to six different beat frequencies are the same amplitude in FIG. 7.

Figure 8:
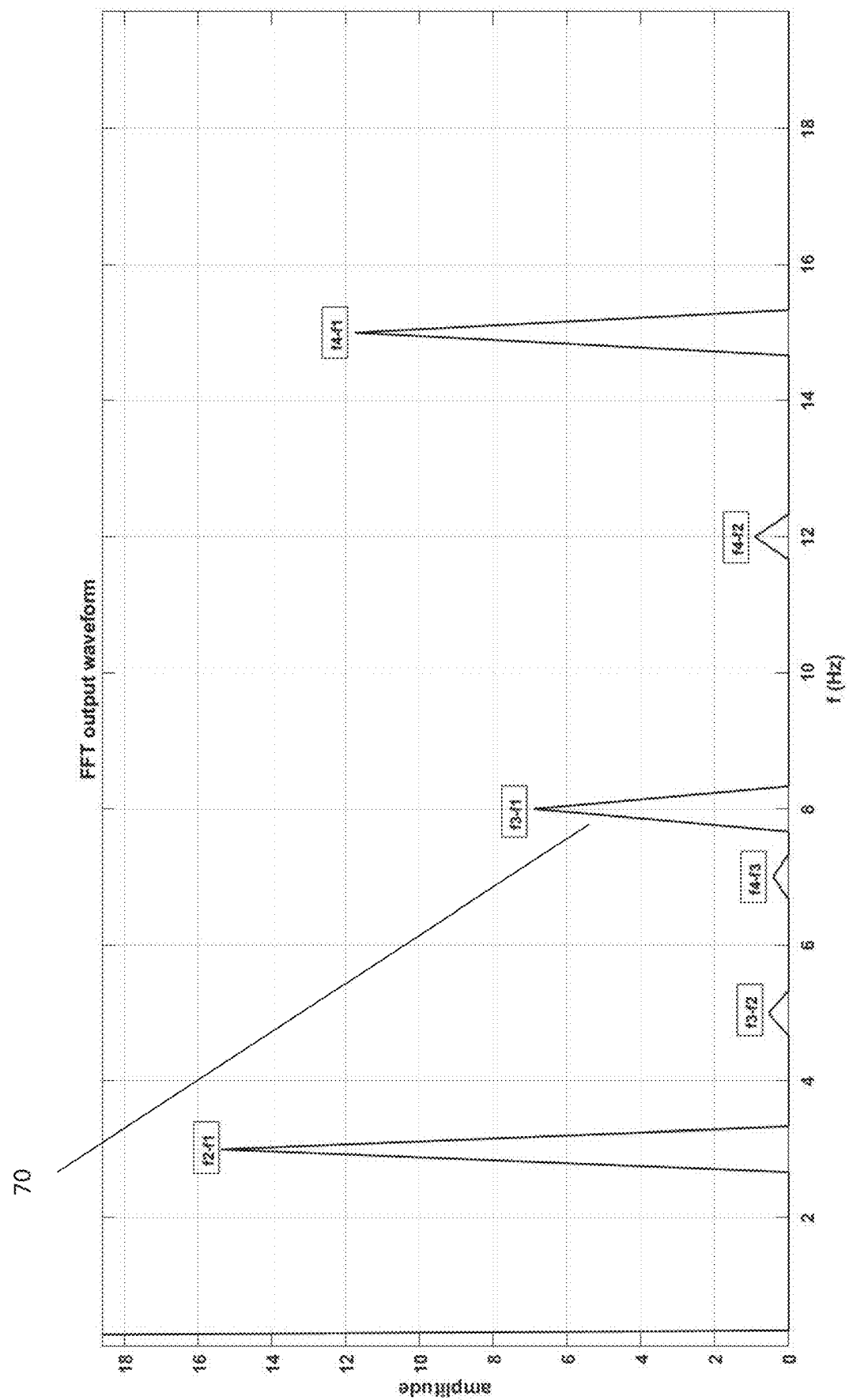
FIG. 8 shows a single-sided spectrum of the frequency power spectrum when the mobile node moves closer to anchor node 1 in FIG. 4.

A change in the location of the receiver can be reflected in a change in the power amplitudes of beating frequencies received by the receiver 10. FIG. 8 shows the frequency power spectrum 80 when the mobile node M moves closer to anchor node 1 (A1) in FIG. 4. We can analyse the change in power amplitudes of beating frequencies corresponding to anchor node 1 (A1). For example, the amplitudes at f2−f1, f3−f1 and f4−1 all increased from 2 in FIGS. 7 to 6 in FIG. 8.

The frequency power spectrum 70, 80 of the squared envelope 60 of the received superimposed signal 30 can be calculated using the equation below:

$$S_n(\omega) = 2\pi \Sigma_{i=1}^n a_i^2 \delta(\omega) + 2\pi \Sigma_{k>l} a_k a_l [\delta(\omega - \omega_k + \omega_l) + \delta(\omega - \omega_k - \omega_l)] \quad (3)$$

wherein k and l varies from 1 to n, wherein n is total number of transmitters. $S_n$ is the frequency power spectrum received from the transmitters. $a_i$ is the amplitude of the transmitted CTE signals 30. $\delta(\omega)$ is a Dirac delta function at frequency $\omega$.

By examining the peak power amplitudes of beating frequencies at ($\omega_k - \omega_l$) frequencies, one can identify the number of dominant concurrent transmitter pairs at the receiver 10. The number of times the power amplitude of beating frequencies goes above a predetermined threshold is the number of dominant concurrent transmitter pairs (i.e., anchors in this case). In this manner, localisation calculations are limited to using strong signals received from transmitters. It can be imagined that, in a situation where localisation is enabled by distributing a large number of transmitters over a large area of coverage, whilst at any given point within the coverage area a receiver may receive signals from all of the transmitters some of the received signals are relatively weak when compared to signal emanating from more closely located transmitters. Any such weaker signals may not be required in accurately determining the location of the receiver or may be detrimental to this determination if their signal quality is poor. This problem is omitted by only considering dominant signals.

The input CTE signal 30 frequencies of the beating components can be extracted using FFT again. Because the different frequency CTE signal 30 components provided by each antenna and the beating frequency signals of the dominant concurrent transmitters are known, the contribution of each pair of concurrent transmitters 20 from the peak amplitudes at ($\omega_k - \omega_l$) beating frequencies can be calculated.

The location of mobile node M (the receiver) can be calculated based on the power amplitudes of the beating components at beating frequencies and the original CTE signal 30 frequency from each transmitter 20. Embodiments use a weighted centroid approach, assuming a path loss model. The weigh centroid approach is less computationally expensive for low-power battery-powered devices.

To determine the location of the receiver 10, the receiver 10 calculates the weights corresponding to each dominant concurrent transmitter pair at its beating frequency and the original CTE signal 30 frequency from each transmitter 20. This is also known as the hybrid approach, which takes into account both the power amplitudes at the beating frequency and at the original CTE signal frequency.

At the receiver, the weights corresponding to each dominant concurrent transmitter pair based on peak amplitudes at beating frequencies and the original CTE signal frequency is calculated using the equation 4 shown below.

$$W(i) = \Sigma_{j \neq i, i,j=1}^n P|\omega_i - \omega_j| + P(\omega_i) \quad (4)$$

$\omega_i - \omega_j$ is the beating frequency and $\omega_i$ is the frequency of the original CTE frequency at each transmitter, wherein P denotes the peak amplitude at those frequencies.

In another embodiment, the location of mobile node M (the receiver 10) can be calculated based on only the power amplitudes of the original CTE signal frequencies, given by equation 5 below. This is also known as the frequency approach, which only takes into account power amplitudes of the original CTE signal frequency.

$$W(i) = P(\omega_i) \quad (5)$$

Using either of the calculated weights above provided by equations 4 or 5 above, a 2D location of the mobile node M (the receiver 10) can be estimated. The weighted 2D coordinates $(x_r, y_r)$ of the Mobile node are calculated using equation 6 and 7 below $$x_r = \Sigma_{i=1}^n (W(i) * x_t(i)) / \Sigma_{i=1}^n W(i) \quad (6)$$

$$y_r = \Sigma_{i=1}^n (W(i) * y_t(i)) / \Sigma_{i=1}^n W(i) \quad (7)$$

wherein $(x_t(i), y_t(i))$ are the known 2D coordinates of the Anchor nodes.

In an embodiment of the invention, a 3D location of the mobile node M (the receiver) can be estimated in combination with another set of spatially distributed antennas situated on a separate plane.

As mentioned above, a Fourier transform of the received superimposed signal 50 would identify the magnitudes and frequencies of all N concurrent CTE signals 30 that are used for localization. However, computing the envelope and extracting the beating frequencies and magnitudes enables the receiver 10 to use additional N(N−1)/2 observations. This provides more observations than N in this case (i.e., N+N(N−1)/2 for the above mentioned hybrid approach) and therefore enables a more accurate estimation of the location without additional channel occupancy in time.

Therefore three different embodiments of localization schemes, as described below, are disclosed:

The first embodiment computes the FFT of the received superimposed signal 50 without computing the squared-envelope 60. This results in N observation points of the superimposed signal 50.

The second embodiment computes the FFT of the squared-envelope signal 60 of the received superimposed signal. This results in (N(N−1)/2) observation points of the superimposed signal 50 leading to higher accuracy than the first embodiment.

The third embodiment (hybrid approach) also computes the FFT of the envelope of the received superimposed signal and also computes weights of each anchor based on both its beating frequency with other anchors and its own original CTE frequency. This results in N+N(N−1)/2 observation points leading to even better localization accuracy of the receiver 10 than both the first and second embodiments.

Figure 9:
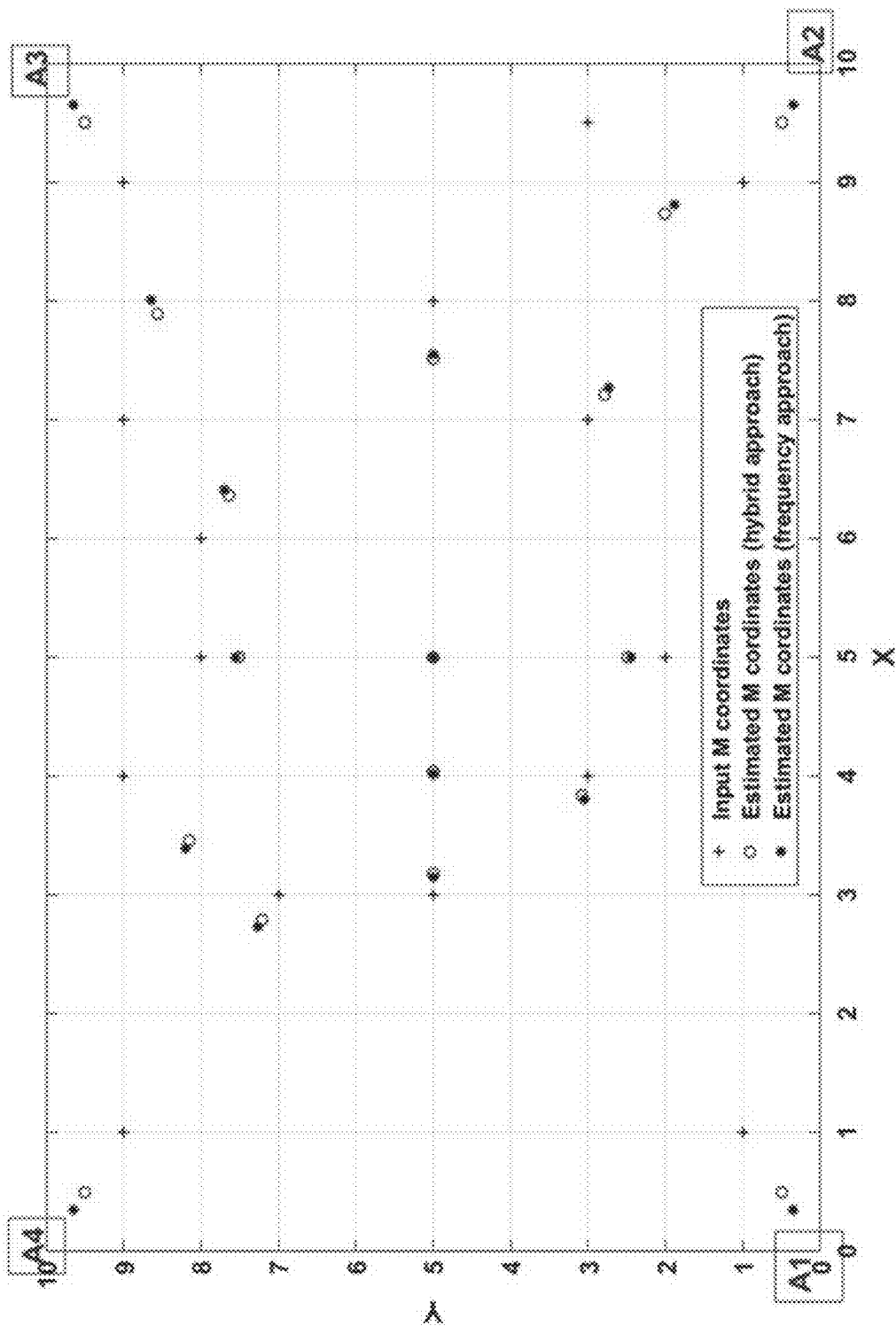
FIG. 9 shows simulation results of estimated coordinates calculated by the hybrid approach and the frequency approach in a multipath-free environment.

FIG. 9 shows simulation results of estimated coordinates calculated by the hybrid approach and the frequency approach in a multipath-free environment. The simulation was implemented in a MATLAB-based simulator and investigated how different profiles of beating frequency power amplitudes and CTE frequency amplitude would affect the receiver location estimates provided by both approaches. The simulation assumes a 2D plane of 10 m×10 m with 4 anchor nodes (A1, A2, A3, A4) on the four corners of the square plane: (0,0); (10,0); (10,10); and (0,10) respectively.

Table 3 below shows the different beating profiles and frequency profiles generated assuming log-distance path loss model with exponent 2. FIG. 9 shows the graphical representation of the estimated locations on the 2D plane for our proposed hybrid approach vs the signal frequency approach.

| Input Mobile Node (M) coordinages | | Received amplitude signal at different frequencies | | | | Received signal amplitude at different beating frequencies | | | | Received signal amplitude at different beating frequencies | | Calculated mobile node-coordinates using hybrid (signal frequencies + beating frequencies) approach | | Calculated mobile node-coordinates using frequency approach | |
|---|---|---|---|---|---|---|---|---|---|---|---|---|---|---|---|
| X | Y | f1 | f2 | f3 | f4 | f2-f1 | f3-f1 | f4-f1 | f3-f2 | f4-f2 | f4-f3 | X | Y | X | Y |
| 5 | 5 | 0.02 | 0.02 | 0.02 | 0.02 | 8.00E−04 | 8.00E−04 | 8.00E−04 | 8.00E−04 | 8.00E−04 | 8.00E−04 | 5.00E+00 | 5.00E+00 | 5 | 5 |
| 5 | 2 | 0.0345 | 0.0345 | 0.0112 | 0.0112 | 0.0024 | 7.75E−04 | 7.75E−04 | 7.75E−04 | 7.75E−04 | 2.52E−04 | 5.00E+00 | 2.49E+00 | 5 | 2.450766 |
| 5 | 8 | 0.0112 | 0.0112 | 0.0345 | 0.0345 | 2.52E−04 | 7.75E−04 | 7.75E−04 | 7.75E−04 | 7.75E−04 | 0.0024 | 5.00E+00 | 7.51E+00 | 5 | 7.549234 |
| 3 | 5 | 0.0294 | 0.0135 | 0.0135 | 0.0294 | 7.95E−04 | 7.95E−04 | 0.0017 | 3.65E−04 | 7.95E−04 | 7.95E−04 | 3.18E+00 | 5.00E+00 | 3.146853147 | 5 |
| 8 | 5 | 0.0112 | 0.0345 | 0.0345 | 0.0112 | 7.75E−04 | 7.75E−04 | 2.52E−04 | 0.0024 | 7.75E−04 | 7.75E−04 | 7.51E+00 | 5.00E+00 | 7.549234136 | 5 |
| 1 | 1 | 0.5 | 0.0122 | 0.0062 | 0.0122 | 0.0122 | 0.0062 | 0.0122 | 1.51E−04 | 2.97E−04 | 1.51E−04 | 4.98E−01 | 4.98E−01 | 0.346777233 | 0.346777 |
| 1 | 9 | 0.0122 | 0.0062 | 0.0122 | 0.5 | 1.51E−04 | 2.97E−04 | 0.0122 | 1.51E−04 | 0.0062 | 0.0122 | 4.98E−01 | 9.50E+00 | 0.346777233 | 9.653223 |
| 9 | 1 | 0.0122 | 0.5 | 0.0122 | 0.0062 | 0.0122 | 2.97E−04 | 1.51E−04 | 0.0122 | 0.0062 | 1.51E−04 | 9.50E+00 | 4.98E−01 | 9.653222767 | 0.346777 |
| 9 | 9 | 0.0062 | 0.0122 | 0.5 | 0.0122 | 1.51E−04 | 0.0062 | 1.51E−04 | 0.0122 | 2.97E−04 | 0.0122 | 9.50E+00 | 9.50E+00 | 9.653222767 | 9.653223 |
| 3 | 7 | 0.0172 | 0.0102 | 0.0172 | 0.0556 | 3.52E−04 | 5.95E−04 | 0.0019 | 3.52E−04 | 0.0011 | 0.0019 | 2.79E+00 | 7.21E+00 | 2.734530938 | 7.265469 |
| 7 | 3 | 0.0172 | 0.0556 | 0.0172 | 0.0102 | 0.0019 | 5.95E−04 | 3.52E−04 | 0.0019 | 0.0011 | 3.52E−04 | 7.21E+00 | 2.79E+00 | 7.265469062 | 2.734531 |
| 7 | 9 | 0.0077 | 0.0111 | 0.1 | 0.02 | 1.71E−04 | 0.0015 | 3.08E−04 | 0.0022 | 4.44E−04 | 0.004 | 7.89E+00 | 8.56E+00 | 8.004322767 | 8.645533 |
| 4 | 9 | 0.0103 | 0.0085 | 0.027 | 0.0588 | 1.76E−04 | 5.57E−04 | 0.0012 | 4.62E−04 | 0.001 | 0.0032 | 3.46E+00 | 8.15E+00 | 3.393881453 | 8.202677 |
| 4 | 5 | 0.0244 | 0.0164 | 0.0164 | 0.0244 | 8.00E−04 | 8.00E−04 | 0.0012 | 5.37E−04 | 8.00E−04 | 8.00E−04 | 4.04E+00 | 5.00E+00 | 4.019607843 | 5 |
| 6 | 8 | 0.01 | 0.0125 | 0.05 | 0.025 | 2.50E−04 | 1.00E−03 | 5.00E−04 | 0.0013 | 6.25E−04 | 0.0025 | 6.36E+00 | 7.64E+00 | 6.41025641 | 7.692308 |
| 4 | 3 | 0.04 | 0.0222 | 0.0118 | 0.0154 | 0.0018 | 9.41E−04 | 0.0012 | 5.23E−04 | 6.84E−04 | 3.62E−04 | 3.84E+00 | 3.08E+00 | 3.803131991 | 3.042506 |
| 9.5 | 3 | 0.0101 | 0.1081 | 0.0203 | 0.0072 | 0.0022 | 4.09E−04 | 1.45E−04 | 0.0044 | 0.0016 | 2.92E−04 | 8.73E+00 | 2.01E+00 | 8.812628689 | 1.88744 |

Table 4 shows the mean localization error in the x & y coordinates of the mobile node M calculated for different approaches in a multipath-free environment.

| Method | X-coordinate error | Y-coordinate error |
|---|---|---|
| Hybrid approach | 0.2813 | 0.3095 |
| Frequency approach | 0.3401 | 0.3678 |

Figure 10:
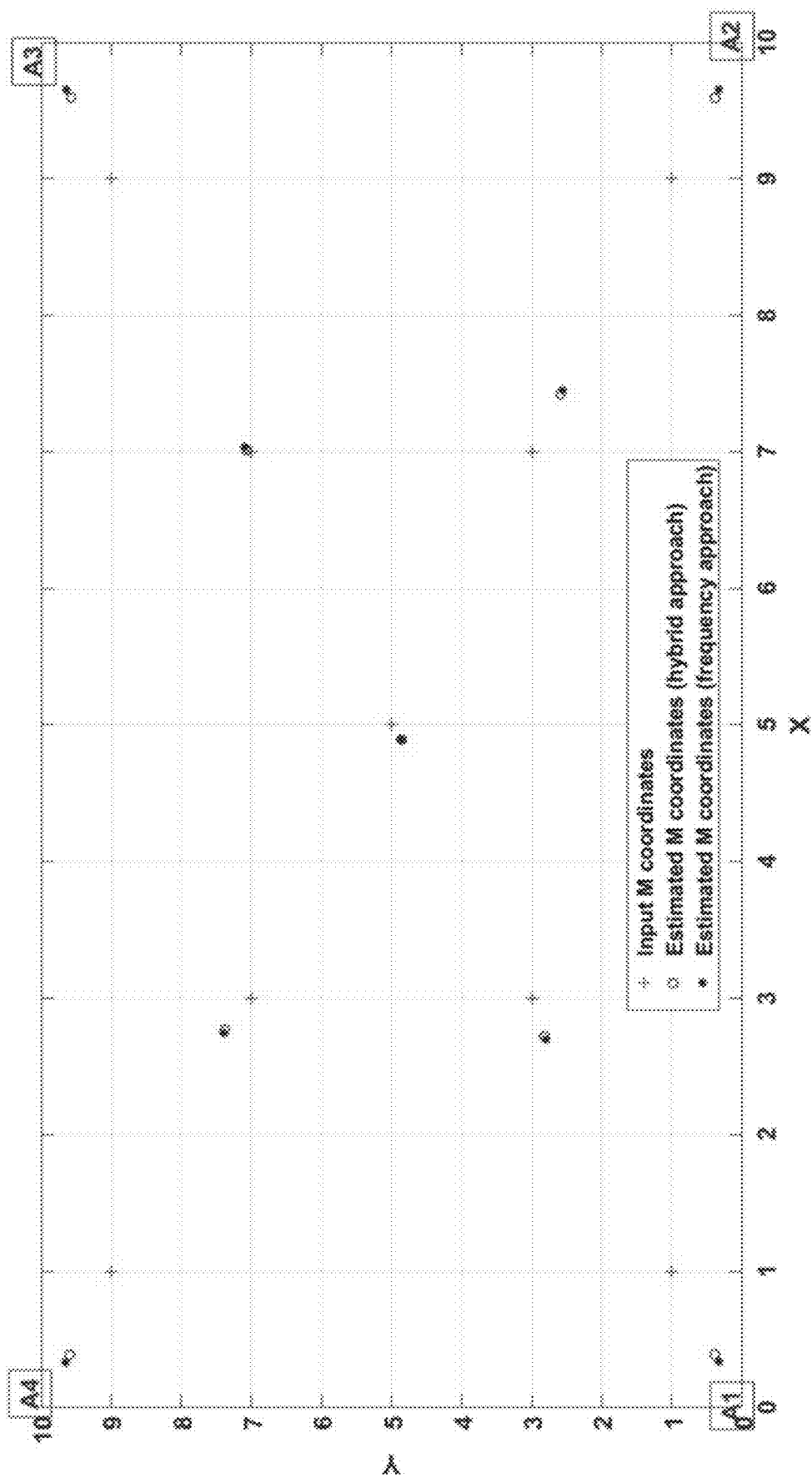
FIG. 10 shows simulation results of estimated coordinates calculated by the hybrid approach and the frequency approach in a multipath environment.

FIG. 10 shows simulation results of estimated coordinates calculated by the hybrid approach and the frequency approach in a multipath environment. The simulation is the same as the simulation in relation to FIG. 8, expect that the simulation in FIG. 9 takes into account Rayleigh fading.

| Input Mobile Node coordinates | | Received signal amplitude at different frequencies | | | | Received signal amplitude at different beating frequencies | | | |
|---|---|---|---|---|---|---|---|---|---|
| X | Y | f1 | f2 | f3 | f4 | f2-f1 | f3-f1 | f4-f1 | f3-f2 |
| 1 | 9 | 0.0111 | 0.0059 | 0.0103 | 0.4639 | 5.12E−05 | 9.1E−05 | 0.0045 | 4.6E−05 |
| 1 | 1 | 0.4495 | 0.0107 | 0.0053 | 0.0106 | 0.0039 | 0.002 | 0.004 | 4.57E−05 |
| 9 | 1 | 0.0107 | 0.4471 | 0.0102 | 0.0057 | 0.0044 | 9.84E−05 | 5.6E−05 | 0.0035 |
| 9 | 9 | 0.0056 | 0.0115 | 0.4521 | 0.011 | 5.78E−05 | 0.0024 | 4.54E−05 | 0.0053 |
| 5 | 5 | 0.0178 | 0.0169 | 0.0161 | 0.0166 | 0.00022 | 0.000234 | 0.000255 | 0.000215 |
| 3 | 3 | 0.0494 | 0.0149 | 0.0092 | 0.0158 | 0.000625 | 0.000358 | 0.000645 | 0.00011 |
| 3 | 7 | 0.0146 | 0.0096 | 0.016 | 0.053 | 0.000118 | 0.000203 | 0.000692 | 0.000125 |
| 7 | 3 | 0.0153 | 0.0552 | 0.0154 | 0.0089 | 0.000774 | 0.000206 | 9.87E−05 | 0.000748 |
| 7 | 7 | 0.0098 | 0.0147 | 0.0446 | 0.0152 | 0.000126 | 0.000399 | 0.000133 | 0.000571 |

| Received signal amplitude at different beating frequencies | | Calculated mobile node-coordinates using hybrid (signal frequencies + beating frequencies) approach | | Calculated mobile node-coordinates using frequency approach | |
|---|---|---|---|---|---|
| f4-f2 | f4-f3 | X | Y | X | Y |
| 0.0022 | 0.0042 | 0.388565 | 9.59247 | 0.329805 | 9.653909 |
| 9.51E−05 | 4.53E−05 | 0.392151 | 0.391119 | 0.336064 | 0.333963 |
| 0.002 | 4E−05 | 9.592282 | 0.387916 | 9.653789 | 0.335655 |
| 0.000115 | 0.0041 | 9.59405 | 9.571577 | 9.654311 | 9.643898 |
| 0.000238 | 0.000242 | 4.89535 | 4.856267 | 4.896142 | 4.851632 |
| 0.000216 | 0.00011 | 2.721448 | 2.821061 | 2.698768 | 2.799552 |
| 0.000389 | 0.000783 | 2.771554 | 7.380149 | 2.746781 | 7.403433 |
| 0.000407 | 0.000111 | 7.421616 | 2.587938 | 7.447257 | 2.563291 |
| 0.00018 | 0.00058 | 7.012862 | 7.071718 | 7.034401 | 7.093713 |

Table 6 shows the mean localization error calculated when Rayleigh fading is taken into account.

| Method | X-coordinate error | Y-coordinate error |
|---|---|---|
| Hybrid approach | 0.3835 | 0.3969 |
| Frequency approach | 0.4202 | 0.4344 |

Accordingly, it is clear from the results that the hybrid approach provides a more accurate estimate of a receiver's location.

Furthermore, the embodiments reduce the number of transmissions required between transmitter 20 and receiver 10. Embodiments are advantageous over previous legacy schemes from an operational standpoint, such as latency and radio resource utilization. By using narrowband radio signals embodiments moreover dispense with the need for advanced hardware associated with wideband systems.

Many current systems still implement Received Signal Strength Indicator (RSSI) systems. For a four transmitter system, as described in FIG. 4, a general transmission schedule for RSSI systems is as follows:

Request from receiver M to anchor A1, Response from A1 to M, M records the RSSI
Request from receiver M to anchor A2, Response from A2 to M, M records the RSSI
Request from receiver M to anchor A3, Response from A3 to M, M records the RSSI
Request from receiver M to anchor A4, Response from A4 to M, M records the RSSI Thereafter, M, the receiver, processes the RSSI from all four anchors and their coordinates to estimates its own location. As can be seen from the schedule above, the RSSI system requires at least eight over-the-air transmissions for a four anchor localization system.

Embodiments, in contrast, require significantly less transmissions. Again, for a four transmitter system, as described in FIG. 4, a transmission schedule embodiments is as follows:

Either M or a dedicated anchor A1 sends a CTE request
All anchors on receiving it transmit a CTE response concurrently Thereafter, Mobile tag M receives the superimposed signal 50 from the concurrent CTE response and applies the above mentioned signal processing, and estimates its coordinates. Accordingly, embodiments only require two over-the-air transmissions over a single channel. The RF footprint in time (channel occupancy) is short enough to complete such transaction even on congested Bluetooth® advertising channels.

Furthermore, embodiments of the localization system provides allows the receiver, or tag, to locate its position itself instead of relying on more computational burdensome methods such as triangulation and trilateration techniques for localization. Moreover, by allowing the receiver, or tag, to locate its position itself, embodiments of the localization system does not require data from the receiver, or tag, to be sent to a transmitter or central control unit and therefore provides a more secure system by improving privacy of a user of the receiver.

Figure 11B:
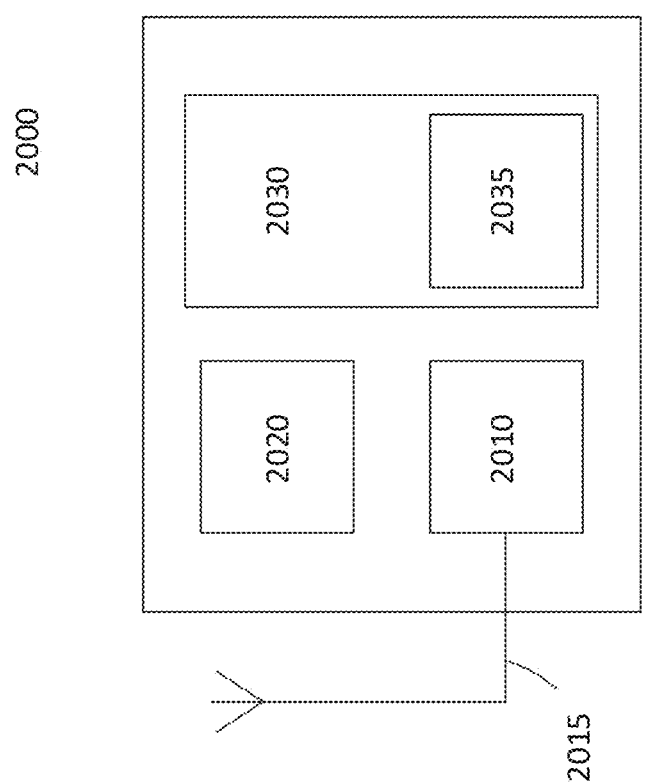
FIG. 11B shows a transmitter according to an embodiment.
Figure 11A:
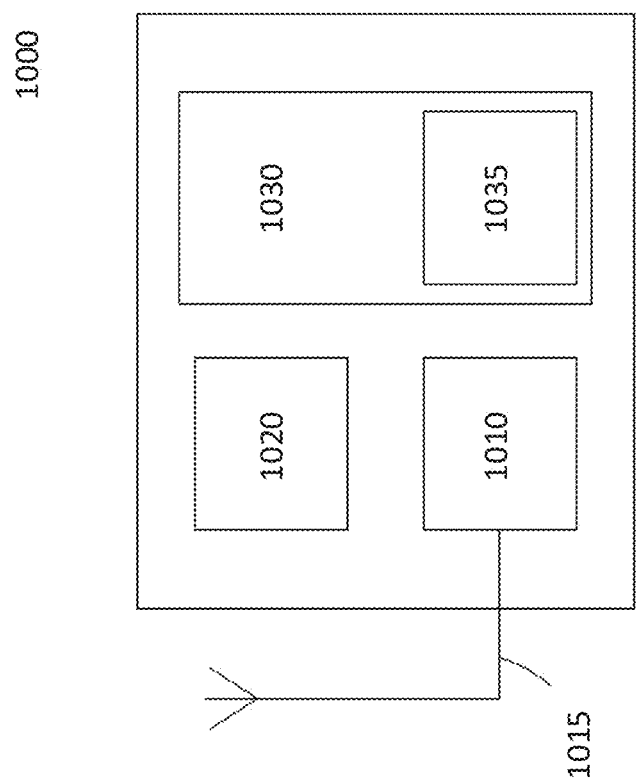
FIG. 11A shows a receiver according to an embodiment.

FIG. 11A shows an embodiment of a receiver device 1000 configured to perform steps of methods as described herein. The device comprises a narrowband receiver 1010, such as the Bluetooth® 2.4 GHz ISM band at 2400-2483.5 MHz, with an antenna 1015, a processor 1020, and a memory 1030 storing computer instructions 1035. The computer instructions 1035 are executable by the processor 1020 to cause the processor 1020 and/or the device 1000 to perform steps of a method as described above. The device 1000 may be a mobile tag M as described above.

FIG. 11B shows an embodiment of a transmitter device 2000 configured to perform steps of methods as described herein. The device comprises a narrowband transmitter 2010, such as the Bluetooth® 2.4 GHz ISM band at 2400-2483.5 MHz, with an antenna 2015, a processor 2020, and a memory 2030 storing computer instructions 2035. The computer instructions 2035 are executable by the processor 2020 to cause the processor 2020 and/or the device 2000 to perform steps of a method as described above. The device 2000 may be an anchor 20 as described above.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A narrowband localization method, comprising:
concurrently transmitting, by a plurality of transmitters, a plurality of narrowband signals, wherein frequencies of respective narrowband signals are different from each other;
receiving, by a receiver, a superimposed signal of the plurality of narrowband signals; and
determining, by the receiver, a location of the receiver relative to the plurality of transmitters based on the superimposed signal received by the receiver,
wherein determining the location, by the receiver, comprises:
calculating, by the receiver, a Fourier transform of the superimposed signal,
identifying, by the receiver, amplitudes of frequency components returned by the Fourier transform, wherein the frequency components correspond to frequencies of the plurality of narrowband signals,
calculating, by the receiver, weights of the frequency components from the narrowband signals based on their respective peak amplitudes, and
determining, by the receiver, a location of the receiver based on the weights and known coordinates of the plurality of transmitters.

2. The narrowband localization method according to claim 1, wherein determining the location, by the receiver, comprises:
identifying, by the receiver, at least one beating component within the superimposed signal, wherein a beating component is a superimposed pair of narrowband signals that form the superimposed signal;
determining, by the receiver, a peak amplitude of the at least one beating component;
determining, by the receiver, peak amplitudes of the plurality of narrowband signals transmitted by the plurality of transmitters;
calculating, by the receiver, weights for each transmitter based on the peak amplitude of the at least one beating component and the peak amplitudes plurality of narrowband signals transmitted by the plurality of transmitters; and
determining, by the receiver, a location of the receiver based on the weights and known coordinates of the plurality of transmitters.

3. The narrowband localization method according to claim 2, wherein the weights for each transmitter are calculated using the equation:

$$W(i) = \Sigma_{j \ne i, i, j=1}^{n} P|\omega_i - \omega_j| + P(\omega_i), \text{ wherein:}$$

W(i) is the weight for each transmitter from the plurality of transmitters;
i and j are indexes for the plurality of transmitters;
$\omega$ is the frequency of the narrowband signal in radians;
$\omega_i - \omega_j$ is the frequency of the at least one beating component; and
P is a function of the peak amplitude at the frequency of the narrowband signal or the at least one beating component.

4. The narrowband localization method according to claim 2, wherein the location of the receiver is determined using the equation:

$$x_r = \Sigma_{i=1}^{n}(W(i) * x_t(i)) / \Sigma_{i=1}^{n} W(i); \text{ and}$$

$$y_r = \Sigma_{i=1}^{n}(W(i) * y_t(i)) / \Sigma_{i=1}^{n} W(i), \text{ wherein:}$$

$(x_r, y_r)$ are the calculated coordinates of the receiver;
W(i) is the weight for each transmitter from the plurality of transmitters;
$(x_t(i), y_t(i))$ are the known 2D coordinates of the plurality of transmitters;
n is a total number of transmitters from the plurality of transmitters; and
i is an index for the plurality of transmitters.

5. The narrowband localization method according to claim 2, wherein identifying the at least one beating component comprises:
calculating, by the receiver, a squared-envelop signal of the superimposed signal;
calculating, by the receiver, a Fourier transform of the squared-envelop signal; and
determining, by the receiver, a number of peaks of the Fourier transform, wherein the number of peaks corresponds to a number of beating component.

6. The narrowband localization method according to claim 5, wherein calculating, by the receiver, a squared-envelop signal of the superimposed signal comprises calculating a squared value of a Hilbert transform of the superimposed signal.

7. The narrowband localization method according to claim 2, wherein the method further comprises determining, by the receiver, at least one dominant beating component amongst the at least one beating component.

8. The narrowband localization method according to claim 7, wherein determining, by the receiver, the at least one dominant beating component amongst the at least one beating component comprises:
determining, by the receiver, at least one beating component that exceeds a predetermined amplitude threshold; and identifying, by the receiver, the at least one beating component that exceeds the predetermined amplitude threshold as the at least one dominant beating component.

9. A narrowband localization method configured to be carried out by a receiver, comprising:
receiving, by the receiver, a superimposed signal of a plurality of narrowband signals, wherein the plurality of narrowband signals were concurrently transmitted by a plurality of transmitters, wherein frequencies of respective narrowband signals are different from each other; and
determining, by the receiver, a location of the receiver relative to the plurality of transmitters based on the superimposed signal received by the receiver,
wherein determining the location, by the receiver, comprises:
calculating, by the receiver, a Fourier transform of the superimposed signal,
identifying, by the receiver, amplitudes of frequency components returned by the Fourier transform, wherein the frequency components correspond to frequencies of the plurality of narrowband signals,
calculating, by the receiver, weights of the frequency components from the narrowband signals based on their respective peak amplitudes, and
determining, by the receiver, a location of the receiver based on the weights and known coordinates of the plurality of transmitters.

10. The narrowband localization method configured to be carried out by a receiver according to claim 9, wherein determining the location, by the receiver, comprises:
identifying, by the receiver, at least one beating component within the superimposed signal, wherein a beating component is a superimposed pair of narrowband signals that form the superimposed signal;
determining, by the receiver, a peak amplitude of the at least one beating component;
determining, by the receiver, peak amplitudes of the plurality of narrowband signals transmitted by the plurality of transmitters;
calculating, by the receiver, weights for each transmitter based on the peak amplitude of the at least one beating component and the peak amplitudes plurality of narrowband signals transmitted by the plurality of transmitters; and
determining, by the receiver, a location of the receiver based on the weights and known coordinates of the plurality of transmitters.

11. The narrowband localization method configured to be carried out by a receiver according to claim 10, wherein the weights for each transmitter are calculated using the equation: $W(i)=\Sigma_{j\neq i, i,j=1}^{n} P|\omega_i-\omega_j|+P(\omega_i)$, wherein:
W(i) is the weight for each transmitter from the plurality of transmitters;
i and j are indexes for the plurality of transmitters;
ω is the frequency of the narrowband signal in radians;
$\omega_i-\omega_j$ is the frequency of the at least one beating component; and
P is a function to determine the peak amplitude at the frequency of the narrowband signal or the at least one beating component.

12. The narrowband localization method configured to be carried out by a receiver according to claim 10, wherein the location of the receiver is determined using the equation:

$$x_r=\Sigma_{i=1}^{n}(W(i)*x_t(i))/\Sigma_{i=1}^{n}W(i); \text{ and}$$

$$y_r=\Sigma_{i=1}^{n}(W(i)*y_t(i))/\Sigma_{i=1}^{n}W(i), \text{ wherein:}$$

$(x_r,y_r)$ are the calculated coordinates of the receiver;
W(i) is the weight for each transmitter from the plurality of transmitters;
$(x_t(i),y_t(i))$ are the known 2D coordinates of the plurality of transmitters;
n is a total number of transmitters from the plurality of transmitters; and
i is an index for the plurality of transmitters.

13. The narrowband localization method according to claim 10, wherein identifying the at least one beating component comprises:
calculating, by the receiver, a squared-envelop signal of the superimposed signal;
calculating, by the receiver, a Fourier transform of the squared-envelop signal; and
determining, by the receiver, a number of peaks of the Fourier transform, wherein the number of peaks corresponds to a number of beating component.

14. The narrowband localization method according to claim 13, wherein calculating, by receiver, a squared-envelop signal of the superimposed signal comprises calculating a squared value of a Hilbert transform of the superimposed signal.

15. The narrowband localization method according to claim 10, wherein the method further comprises determining, by the receiver, at least one dominant beating component amongst the at least one beating component.

16. The narrowband localization method according to claim 15, wherein determining, by the receiver, the at least one dominant beating component amongst the at least one beating component comprises:
determining, by the receiver, at least one beating component that exceeds a predetermined amplitude threshold; and
identifying, by the receiver, the at least one beating component that exceeds the predetermined amplitude threshold as the at least one dominant beating component.

17. A nontransitory computer readable storage medium comprising instructions for execution by at least one processor of a receiver that are configured to cause the at least one processor, when executed by the at least one processor, to when executed:
cause the receiver to receive a superimposed signal of a plurality of narrowband signals, wherein the plurality of narrowband signals were concurrently transmitted by a plurality of transmitters, wherein frequencies of respective narrowband signals are different from each other;
cause the receiver to determine a location of the receiver relative to the plurality of transmitters based on the superimposed signal received by the receiver;
cause the receiver to identify at least one beating component within the superimposed signal, wherein a beating component is a superimposed pair of narrowband signals that form the superimposed signal;
cause the receiver to determine a peak amplitude of the at least one beating component;

cause the receiver to determine peak amplitudes of the plurality of narrowband signals transmitted by the plurality of transmitters;

cause the receiver to calculate weights for each transmitter based on the peak amplitude of the at least one beating component and the peak amplitudes plurality of narrowband signals transmitted by the plurality of transmitters; and cause the receiver to determine a location of the receiver based on the weights and known coordinates of the plurality of transmitters.

18. A narrowband localization method, comprising:

concurrently transmitting, by a plurality of transmitters, a plurality of narrowband signals, wherein frequencies of respective narrowband signals are different from each other;

receiving, by a receiver, a superimposed signal of the plurality of narrowband signals; and determining, by the receiver, a location of the receiver relative to the plurality of transmitters based on the superimposed signal received by the receiver, wherein determining the location, by the receiver, comprises:
identifying, by the receiver, at least one beating component within the superimposed signal, wherein a beating component is a superimposed pair of narrowband signals that form the superimposed signal,
determining, by the receiver, a peak amplitude of the at least one beating component,
determining, by the receiver, peak amplitudes of the plurality of narrowband signals transmitted by the plurality of transmitters,
calculating, by the receiver, weights for each transmitter based on the peak amplitude of the at least one beating component and the peak amplitudes plurality of narrowband signals transmitted by the plurality of transmitters, and
determining, by the receiver, a location of the receiver based on the weights and known coordinates of the plurality of transmitters.

19. A narrowband localization method configured to be carried out by a receiver, comprising:

receiving, by the receiver, a superimposed signal of a plurality of narrowband signals, wherein the plurality of narrowband signals were concurrently transmitted by a plurality of transmitters, wherein frequencies of respective narrowband signals are different from each other; and determining, by the receiver, a location of the receiver relative to the plurality of transmitters based on the superimposed signal received by the receiver, wherein determining the location, by the receiver, comprises:
identifying, by the receiver, at least one beating component within the superimposed signal, wherein a beating component is a superimposed pair of narrowband signals that form the superimposed signal,
determining, by the receiver, a peak amplitude of the at least one beating component,
determining, by the receiver, peak amplitudes of the plurality of narrowband signals transmitted by the plurality of transmitters,
calculating, by the receiver, weights for each transmitter based on the peak amplitude of the at least one beating component and the peak amplitudes plurality of narrowband signals transmitted by the plurality of transmitters, and
determining, by the receiver, a location of the receiver based on the weights and known coordinates of the plurality of transmitters.

20. A nontransitory computer readable storage medium comprising instructions for execution by at least one processor of a receiver that are configured to cause the at least one processor, when executed by the at least one processor, to when executed:

cause the receiver to receive a superimposed signal of a plurality of narrowband signals, wherein the plurality of narrowband signals were concurrently transmitted by a plurality of transmitters, wherein frequencies of respective narrowband signals are different from each other;

cause the receiver to determine a location of the receiver relative to the plurality of transmitters based on the superimposed signal received by the receiver;

cause the receiver to calculate a Fourier transform of the superimposed signal;

cause the receiver to identify amplitudes of frequency components returned by the Fourier transform, wherein the frequency components correspond to frequencies of the plurality of narrowband signals;

cause the receiver to calculate weights of the frequency components from the narrowband signals based on their respective peak amplitudes; and cause the receiver to determine a location of the receiver based on the weights and known coordinates of the plurality of transmitters.

\* \* \* \* \*